US011753929B2

(12) United States Patent
Russell (10) Patent No.: US 11,753,929 B2
(45) Date of Patent: Sep. 12, 2023

(54) SYSTEM AND METHOD FOR RETRIEVING IN-LINE LEAK DETECTION DEVICES

(71) Applicant: Russell NDE Systems Inc., Edmonton (CA)

(72) Inventor: David E. Russell, Edmonton (CA)

(73) Assignee: Russell NDE Systems Inc., Edmonton (CA)

(*) Notice: Subject to any disclaimer, the term of this patent is extended or adjusted under 35 U.S.C. 154(b) by 32 days.

(21) Appl. No.: 17/644,611

(22) Filed: Dec. 16, 2021

(65) Prior Publication Data

US 2022/0213748 A1    Jul. 7, 2022

Related U.S. Application Data

(60) Provisional application No. 63/133,687, filed on Jan. 4, 2021.

(51) Int. Cl.
  *E21B 47/10*   (2012.01)
  *G01M 3/28*   (2006.01)
  *F17D 5/02*   (2006.01)

(52) U.S. Cl.
  CPC ............ *E21B 47/10* (2013.01); *F17D 5/02* (2013.01); *G01M 3/2823* (2013.01)

(58) Field of Classification Search
  CPC .. E21B 47/10; F17D 5/00; F17D 5/02; G01M 3/00; G01M 3/28; G01M 3/2823
  See application file for complete search history.

(56) References Cited

U.S. PATENT DOCUMENTS 6,733,665 B1   5/2004   Khalil
6,931,952 B2   8/2005   Rantala et al.
(Continued)

FOREIGN PATENT DOCUMENTS

KR   10-0536063 B1   12/2005
WO   2008/149092 A1   12/2008

OTHER PUBLICATIONS

Chatzigeourgiou, D.M., "Analysis and Design of an In-Pipe System for Water Leak Detection," Master's Thesis, Massachusetts Institute of Technology, <https://dspace.mit.edu/handle/1721.1/62529>, Sep. 2010, 133 pages.
(Continued)

*Primary Examiner* — Nguyen Q. Ha
(74) *Attorney, Agent, or Firm* — CHRISTENSEN O'CONNOR JOHNSON KINDNESS PLLC (57) ABSTRACT

A system to retrieve a buoyant leak detector (76) traveling with the fluid flowing in a pipeline (24), includes a catchment device (38) located above the bottom interior of the pipeline. Flexible, elongate manifold structures (30) are constructed with fluid outlet openings (54) extending along the manifold structures. The manifold structures are deployable to lie across the lower inside perimeter of the pipeline, upstream from the catchment device. A source of pressurized air is routed to the manifold structure, whereby air bubbles are emitted from the nozzles of the manifold structure to form a sheet or curtain of air bubbles that flow in the direction downstream of the fluid flow in the pipeline and at an angle upwardly from the location of the manifold structures to cause the leak detector to be deflected by the bubble curtain toward the catchment device.

21 Claims, 14 Drawing Sheets

(56) References Cited

U.S. PATENT DOCUMENTS

| | | |
|---|---|---|
| 7,523,666 B2 | 4/2009 | Thompson et al. |
| 8,098,063 B2 | 1/2012 | Paulson |
| 9,188,270 B2 | 11/2015 | Di Lullo et al. |
| 10,801,915 B2 | 10/2020 | Ramirez Garcia |
| 2014/0009598 A1 | 1/2014 | O'Donnell et al. |
| 2018/0171783 A1 | 6/2018 | van Pol et al. |
| 2020/0131899 A1* | 4/2020 | Chen ............... E21B 47/10 |
| 2020/0292136 A1* | 9/2020 | Long, III ......... G05B 23/021 |

OTHER PUBLICATIONS

Direct-C Leak Detection Systems, "Direct Hydrocarbon Leak Detections Based on Nanocomposite Sensors," <https://dynamicrisk.net/wp-content/uploads/2017/11/Direct-C-DynamicRisk-Presentation-Nov-17.pdf>, Nov. 2017, 24 pages.

Oliviera, F., et al., "Smartball: A New Pipeline Leak Detection System, and its Survey of Two Petrobras / Transpetro Pipelines Field Tests," Rio Pipeline Conference & Exposition, Sep. 20-22, 2011, 10 pages.

Chapman, H., "Development of a Successful Untethered Leak Detection and Pipe Wall Condition Assessment Technology for Large Diameter Pipelines," <https://www.waternz.org.nz/Article?Action=View&Article_id=648?>, Water New Zealand Annual Conference, Jun. 2016, 9 pages.

\* cited by examiner

SYSTEM AND METHOD FOR RETRIEVING IN-LINE LEAK DETECTION DEVICES

CROSS-REFERENCE TO RELATED APPLICATION

This application claims the benefit of U.S. Provisional Application No. 63/133,687, filed Jan. 4, 2021, the entire contents of which are incorporated herein by reference.

BACKGROUND

Leaks in pipelines, especially in the water and waste-water industry are particularly serious problems. It has been estimated that on average in North America, only 70% of the water that is treated for drinking actually makes it to the taps of consumers. The 30% that is "lost" leaks out of pipeline joints that are not well sealed, or out of corroded-through holes in the pipes into the ground. In addition to the loss of potable water, the chlorine used to treat the water is an environmental contaminant. Leaks from waste-water pipes are even more polluting due the phosphates and other chemicals that are flushed down drains and mix with water from industrial users without reaching the treatment plant.

In order to detect the location of leaks, pipeline owners employ "leak noise correlators" and above-ground listening devices to try to detect the sound that a leak makes when the pressurized water is escaping through a pipeline joint or corrosion hole. These "above ground" correlators are quite effective in the case of pipes that are buried within 6' of the ground surface, but can be ineffective if the depth of burial exceeds 6', and if the leak if more than a few hundred feet away.

To improve leak detection, detection manufacturing companies have developed leak detection spheres, which are self-contained devices that "go with the flow" and detect leaks very effectively when they pass within one pipe diameter of the leak location, so long as the leak is actually making a noise. What remains, then, is a method to launch and trap these devices from the active pipelines.

The launch of these devices through an existing combination air release valve (CARV) which may be 4", 6" or larger in diameter is relatively simple. All that is needed is a "stuffing box" and a plunger. For pipelines smaller than 16" diameter, a net, or a cage ("basket") can be used quite effectively to capture the leak detection sphere.

However, trapping the detection spheres gets more and more challenging as the pipeline diameter increases. Part of this problem relates to the size of the net that would be required for a large diameter pipe, for example a 120 inch diameter pipeline, and having to introduce that large net through a 4" CARV. The more significant issue, though, is the drag forces that the current inside the pipe imposes on a large net, which makes using a net for this purpose impractical.

The present disclosure seeks to address the need for capturing leak detection spheres in large diameter pipelines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a system is provided to retrieve a buoyant leak detector traveling with fluid flowing in a pipeline. The system includes: (a) a catchment device positionable above the bottom interior of the pipeline; (b) a flexible, elongate manifold structure having fluid outlet openings extending along the manifold structure; (c) a deployment system to deploy the manifold structure across the lower inside perimeter of the pipeline upstream from the catchment device; and (d) a source of pressurized air or water in communication with the manifold structure, whereby when the pressurized air or water is supplied to the manifold structure, a curtain of air bubbles or water stream is emitted from the nozzles of the manifold structure in the direction downstream of the fluid flow in the pipeline and at angle upwardly from the location of the manifold structure to cause the leak detector to be deflected by the bubbles or water stream toward the catchment device.

In any of the embodiments described herein, wherein the manifold structure comprises a perimeter frame and a tube extending along and attached to the perimeter frame.

In any of the embodiments described herein, wherein the perimeter frame comprises a plurality of links connected together in end-to-end relationship.

In any of the embodiments described herein, wherein the perimeter frame further comprises connectors that interconnect the adjacent end portions of the links to allow adjacent links to flex or rotate relative to each other through a limited angle in one direction only.

In any of the embodiments described herein, wherein the links of the perimeter frame are in the form of U-shaped channel members, and the tube is disposed between the flanges of the channel members.

In any of the embodiments described herein, wherein the deployment system comprises a pivotable extension arm having one end deployable to the bottom of the pipeline interior and a second end connected to the manifold structure, the first control line attached to a second end of the extension arm, and a first actuator located exterior to the pipeline to control the length of the first control line, which in turn controls the orientation of the extension arm between a retracted generally vertical position and a deployed generally horizontal position.

In any of the embodiments described herein, wherein, when in deployed position, the extension arm is disposed on the bottom surface of the pipeline in the direction upstream relative to the flow of the pipeline.

In any of the embodiments described herein, wherein the second end of the extension arm is attached to the manifold structure at a location intermediate the ends of the manifold structure.

In any of the embodiments described herein, wherein the manifold structure comprises two sections, with the adjacent ends of the two sections attached to the second end of the extension arm.

In any of the embodiments described herein, further comprising second and third control lines attached to the ends of the manifold structure, second and third actuators located exterior to the pipeline to control the lengths of the second and third control lines to position the manifold structure between a retracted position or, if the manifold structure is positioned longitudinally adjacent the extension arm and a deployed position or if the manifold structure lies along the inside surface of the pipeline, generally transversely to the length of the pipeline.

In any of the embodiments described herein, further comprising a spine deployable into the pipeline in an orientation substantially diametrical to the pipeline, the spine providing a mounting location for the first end of the extension arm.

In any of the embodiments described herein, wherein the spine provides a mounting location for the catchment device.

In any of the embodiments described herein, wherein the pressurized air or water is routed to the manifold structure through the extension arm.

In any of the embodiments described herein, further comprising a spine deployable into the pipeline in an orientation substantially diametrical to the pipeline, the spine providing a support for the deployment system.

In any of the embodiments described herein, wherein the spine provides a mounting location for the catchment device.

In any of the embodiments described herein, wherein the pressurized air or water is routed to the manifold structure through components of the deployment system.

In any of the embodiments described herein, wherein the catchment device comprises a net structure.

In any of the embodiments described herein, wherein the net structure is positioned adjacent the top of the interior of the pipeline.

In accordance with one embodiment of the present invention a method is provided of retrieving a buoyant leak detector traveling with the fluid flowing in a pipeline. The method includes positioning a catchment device in the upper region of the pipeline and emitting a curtain of air bubbles or water stream from a lower region of the pipeline and from a location upstream from the catchment devices in a volume rate that causes the air bubbles or water stream to flow upwardly toward the catchment device as the air bubbles or water stream flows downstream with the fluid flowing in the pipeline to direct the leak detector toward the catchment device.

In any of the embodiments described herein, further comprising deploying a manifold across a lower region of the pipeline and at a location up stream of the catchment device, the manifold having a plurality of outlet nozzles along the length of the manifold; and supplying air or water to the manifold for emission through the outlet nozzles and into the flow stream of the pipeline.

In any of the embodiments described herein, wherein the manifold is deployed from a location exterior of the pipeline.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter, and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

A leak detector retrieval system 20 includes in basic form an elongated spine or stanchion 22 insertable into a pipeline 24 through a combination air release valve (CARV) 26 located on the top of the pipeline to extend upwardly therefrom. The retrieval system 20 also includes an elongated extension arm 28 having a proximal end pivotally mounted to the lower end of the spine 22. The adjacent, inward ends of flexible manifold structures 30 are attached to the distal end 32 of the extension arm 28. A control line 34 is attached to the distal end 32 of the extension arm, with the control line being extended and retracted by an external actuator, not shown. Control lines 36a and 36b are attached to the distal ends of the manifold structures 30 and also controlled by external actuators. The control lines 34, 36a and 36b are operable to deploy the system 20 from a folded condition where in the spine, extension arm and manifold structures are disposed in a longitudinal bundle and a deployed condition where in the manifold structures lie transversely across the bottom of the pipe line. Pressurized air is supplies to the manifold structure to emit air bubble to create a curtain of bubbles that rise upwardly in the downstream direction to direct a buoyant leak detector toward a catchment device 38, for example a net or basket, positioned near the top interior 46 of the pipeline.

Figure 1:
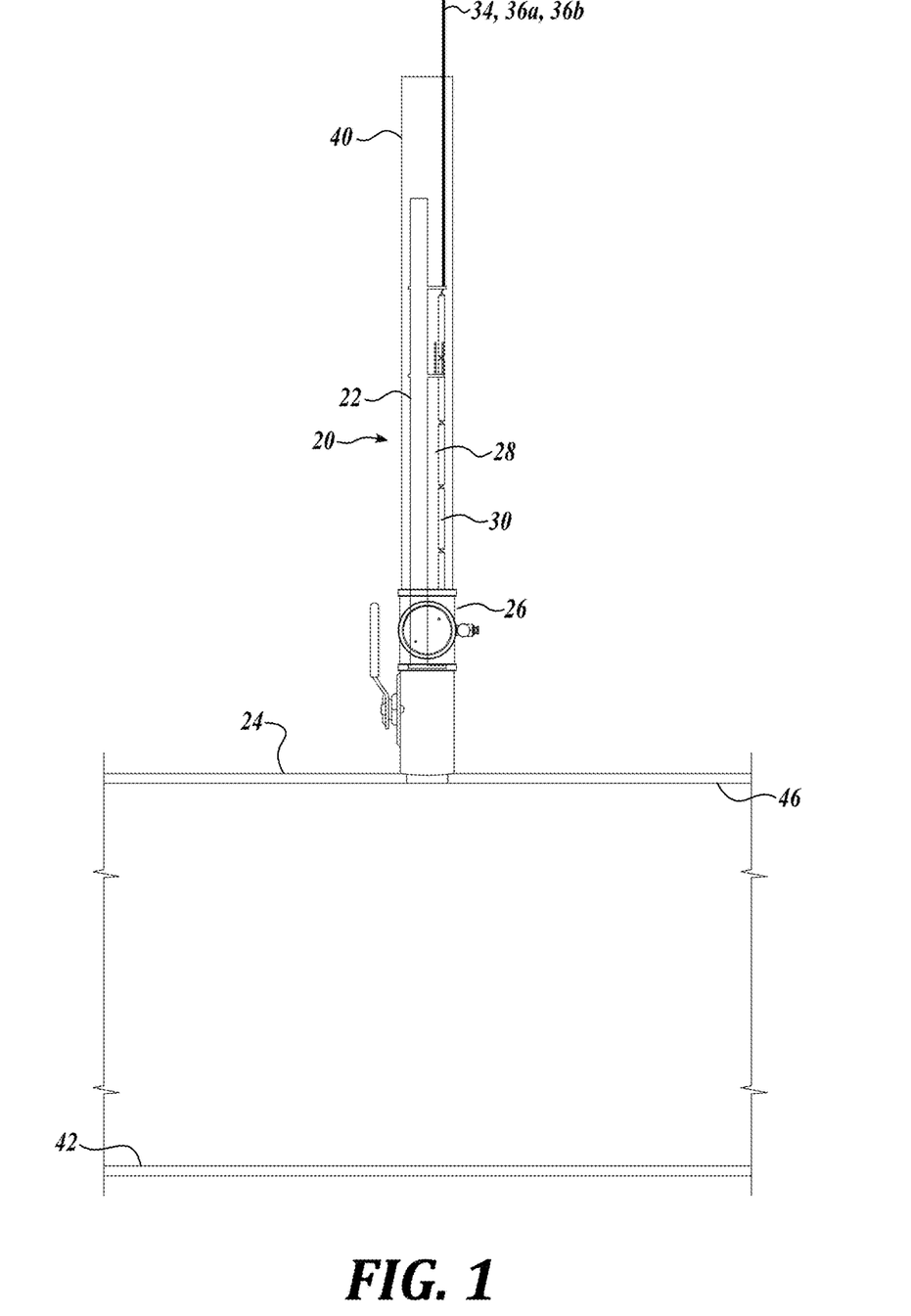
FIG. 1 is an elevational view of the leak detector retrieval assembly enfolded configuration disposed within an inlet tube to a CARV.
Figure 2:
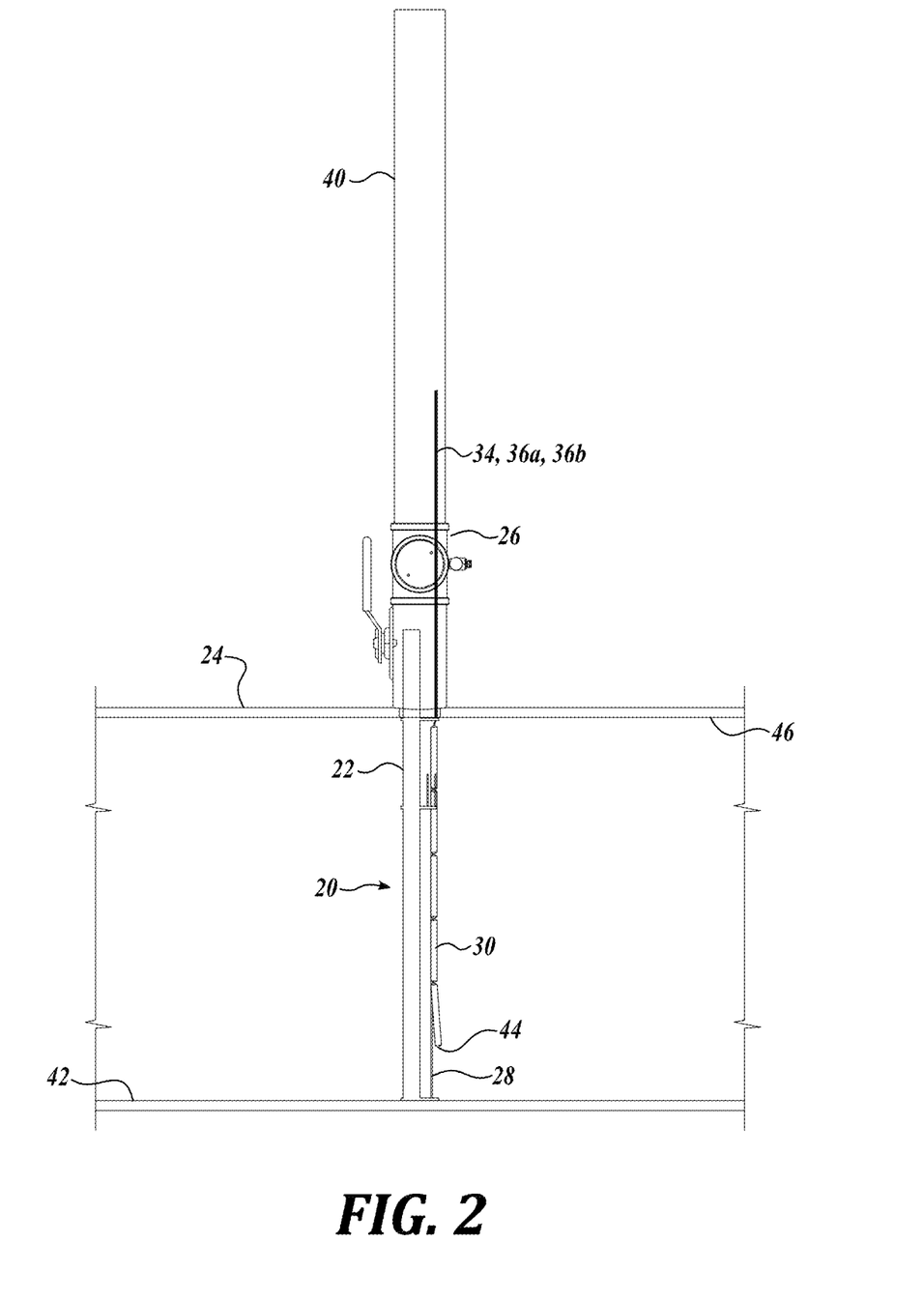
FIG. 2 is a view similar to FIG. 1, with the leak detector retrieval assembly positioned in a pipeline.
Figure 3:
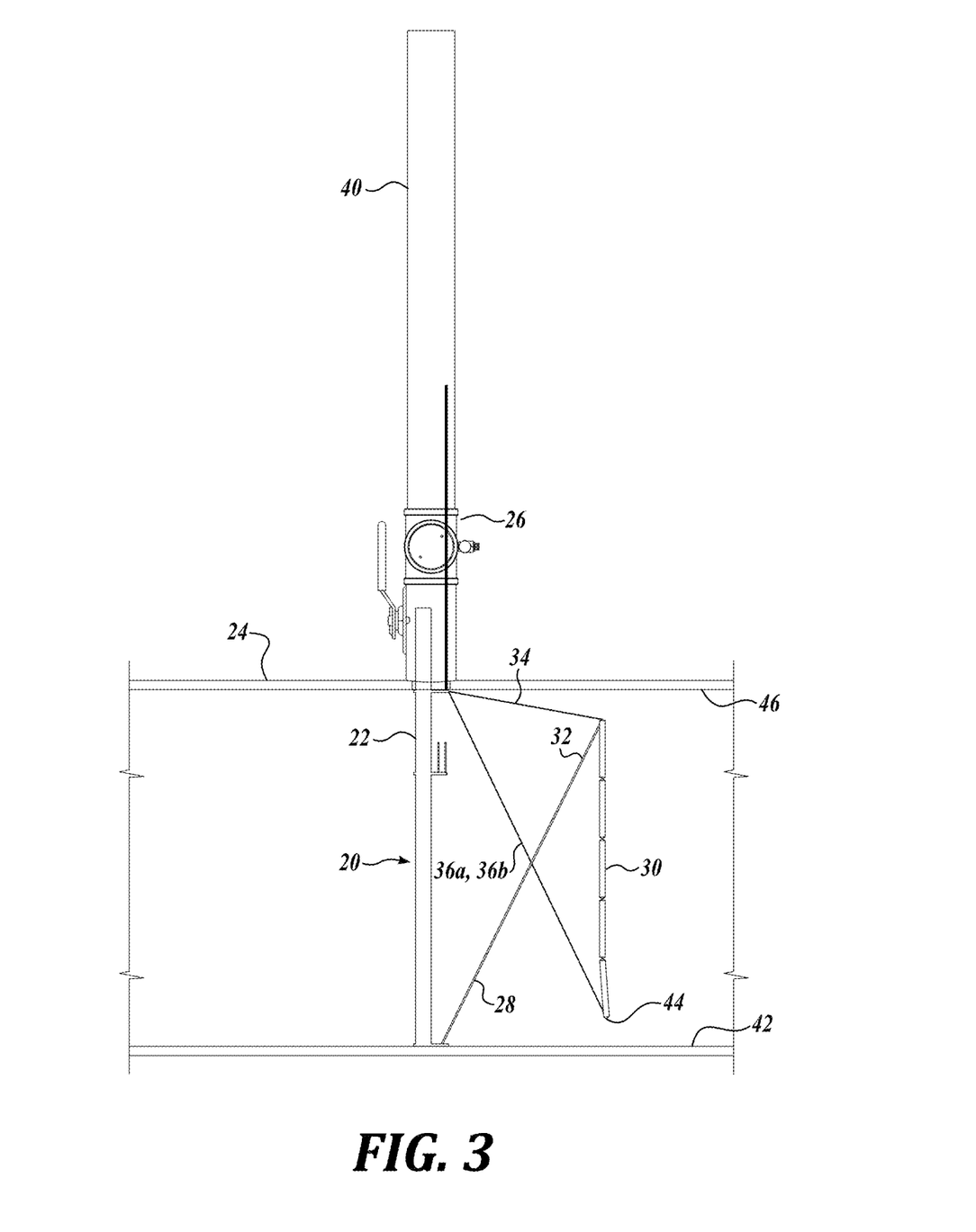
FIG. 3 is a view similar to FIG. 2, showing the retrieval assembly partially deployed.

Next describing the leak detector retrieval system 20 in more detail, the leak detector is shown in FIG. 1 as in folded, bundled configuration so as to fit through inlet tube 40 extending upwardly from CARV 26. FIG. 2 shows the leak detector assembly 20, still in folded configuration, lower downwardly into pipeline 24. FIG. 3 depicts the leak detector retrieval assembly 20 in partially deployed configuration, wherein control line 34 is being paid out by its actuator so as to allow the extension arm 28 to pivot relative to the lower end of spine 22, thereby lowering the distal end 32 of the extension arm downwardly toward the bottom 42 of the pipeline 24. Simultaneously, the control lines 36a and 36b are also paid out by the external actuators to allow the distal ends 44 of the manifold structures 30 to unfold from the spine 22.

Figure 4:
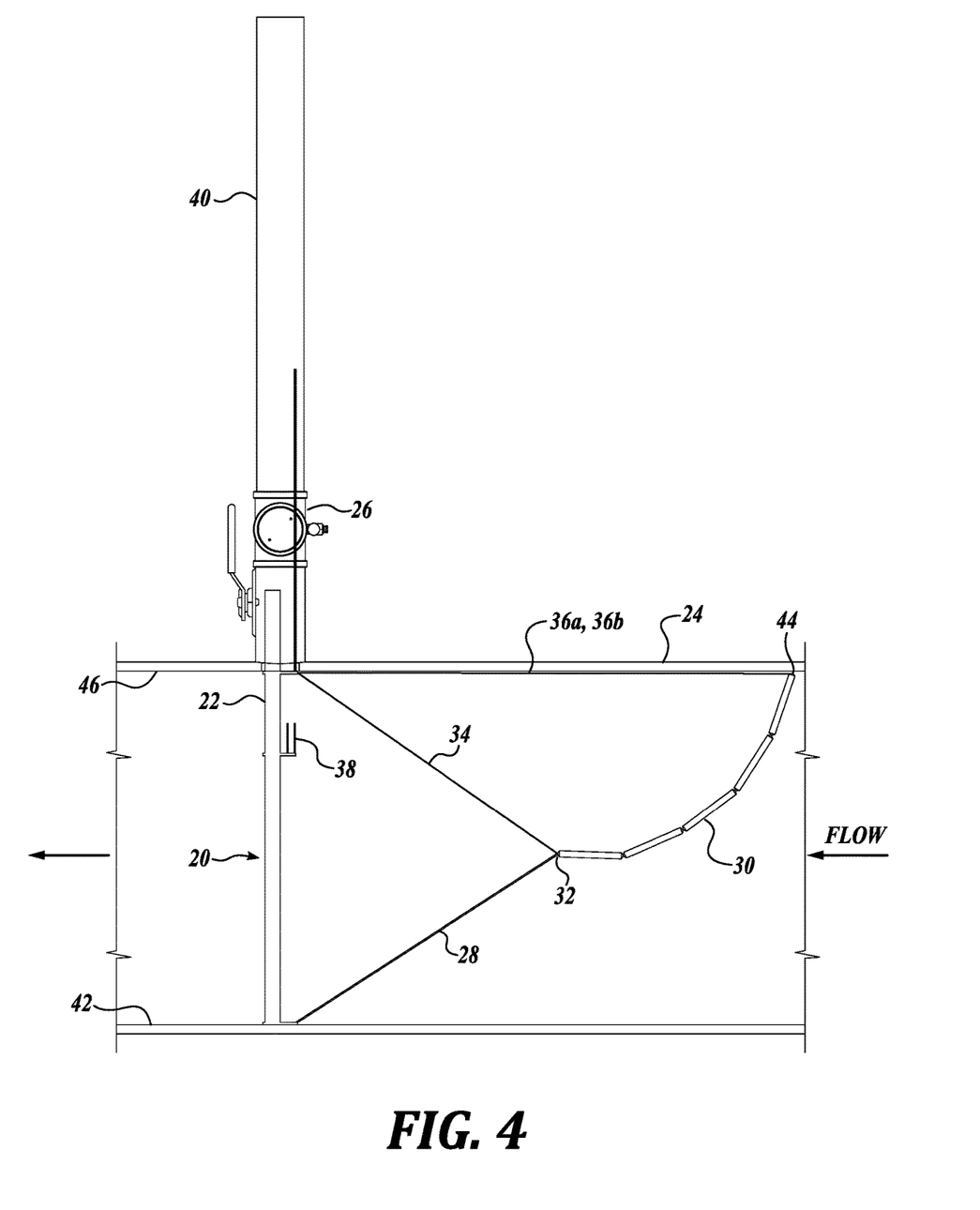
FIG. 4 is a view similar to FIG. 3, showing the retrieval assembly further deployed than showing in FIG. 3.
Figure 5:
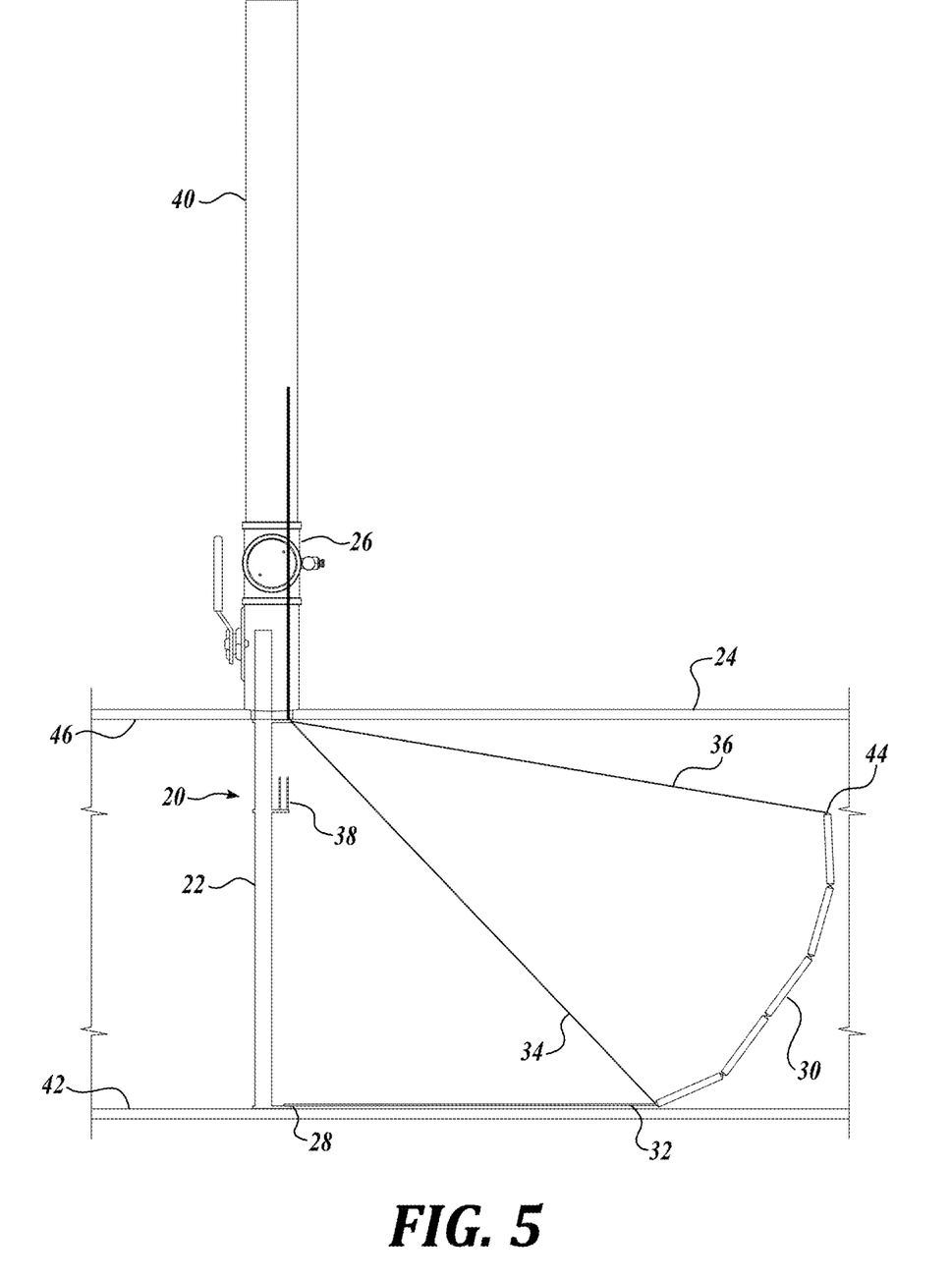
FIG. 5 is a view similar to FIG. 4, showing the retrieval assembly further deployed than in FIG. 4.
Figure 6:
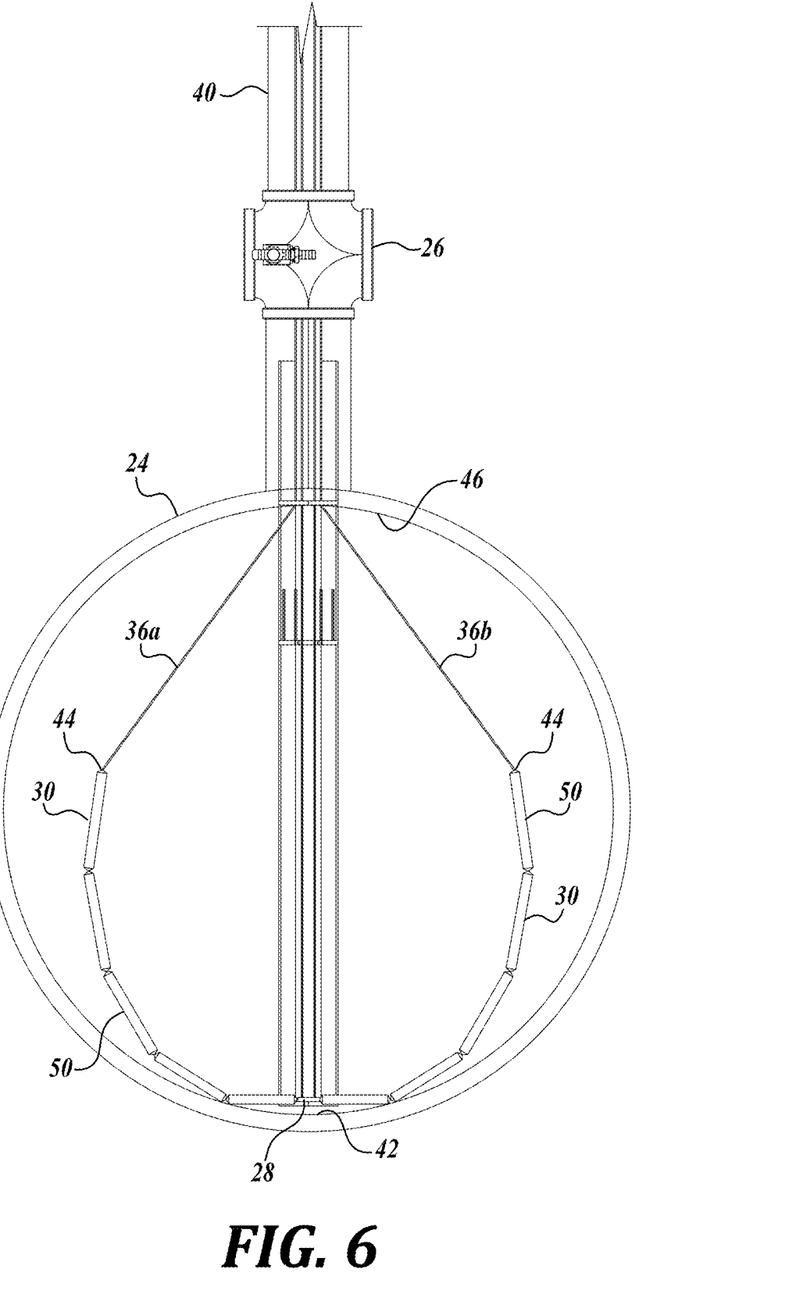
FIG. 6 is a view similar to FIG. 5, looking downstream relative to the pipeline flow.
Figure 7:
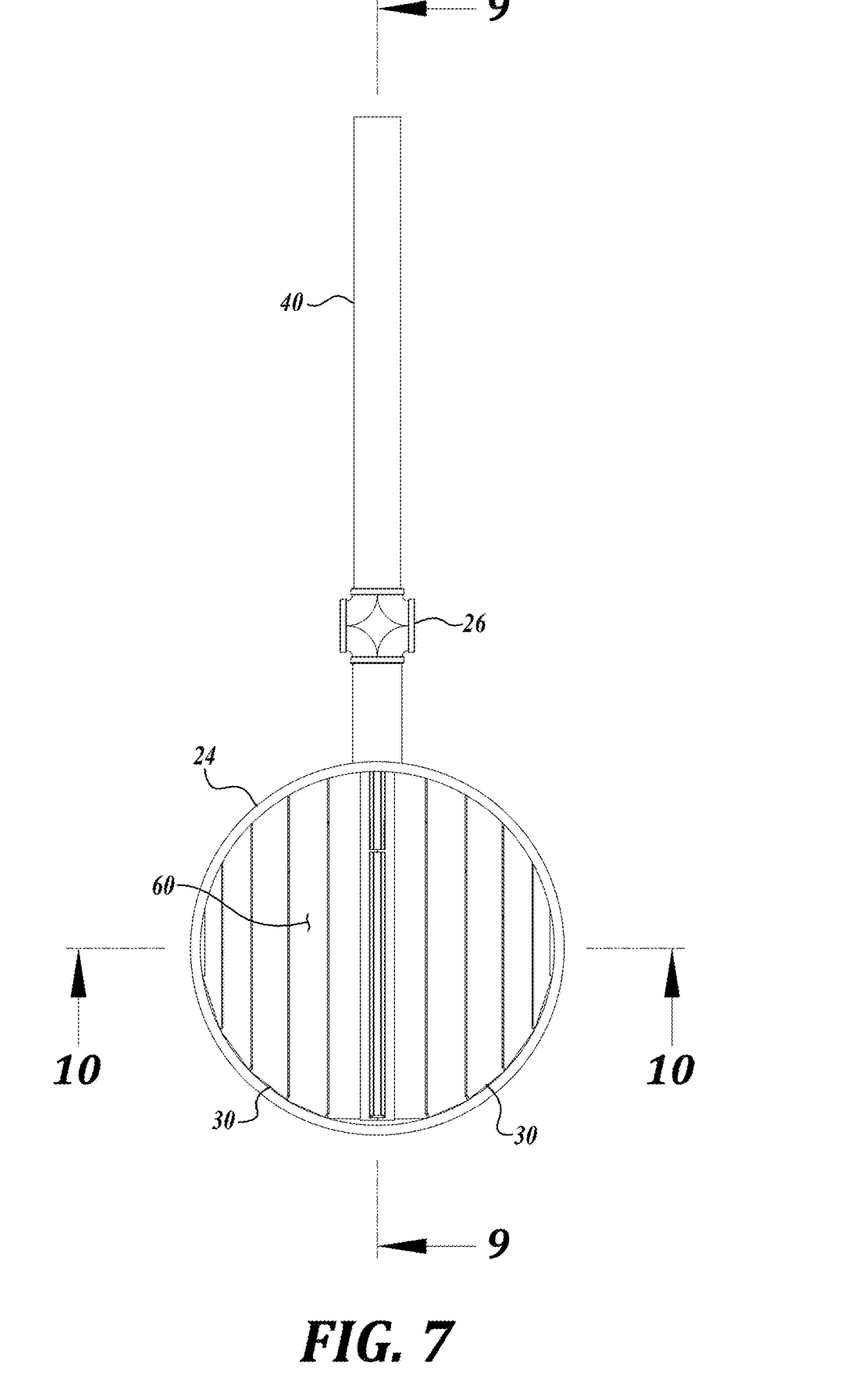
FIG. 7 is a view similar to FIG. 6, showing the retrieval assembly fully deployed.

FIGS. 4, 5, and 6 illustrate further progression of the deployment (unfolding) of the leak detector retrieval system 20. In this regard in FIG. 4, the distal end 32 of the extension arm 28 is further lowered in the direction upstream from the location of the spine 22. The payout of the control lines 36a and 36b is restricted so that the distal ends 44 of the manifold structures 30 remains near the top interior 46 of the pipeline 24. The weight of the manifold structures 30 causes the distal end 32 of the extension arm to lower downwardly through and against the flow stream in the pipeline.

In FIGS. 5 and 6, the distal end 32 of the extension arm is shown as lowered to the bottom of the pipeline 42. Also, the control lines 36a and 36b are further paid out so that the distal ends 44 of the manifold structures 30 are allowed to lower relative to the top 46 of the pipeline. As shown in FIGS. 4, 5, and 6, as the manifold structures 30 are being deployed they are allowed to flex in the downstream direction, but not in the upstream direction, as described more fully below.

FIGS. 7-10 show the leak detector assembly 20 as fully deployed. In this regard, the manifold structures 30 are disposed transversely along and against the lower surface of the pipeline due to the weight of the manifold structure, see in particular FIG. 7. The control lines 36a and 36b are adjusted to allow the manifold structure 32 to assume this configuration/position. Pressurized air is emitted from locations along the length of the manifold structures 30, which creates air bubbles in the fluid flow within the pipeline 24. The force of the air bubbles emitting from the manifold structure also helps maintain the manifold structure against the pipe line surface. The buoyancy of the air bubbles cause the air bubbles to flow diagonally upwardly in the downstream direction.

Figure 11:
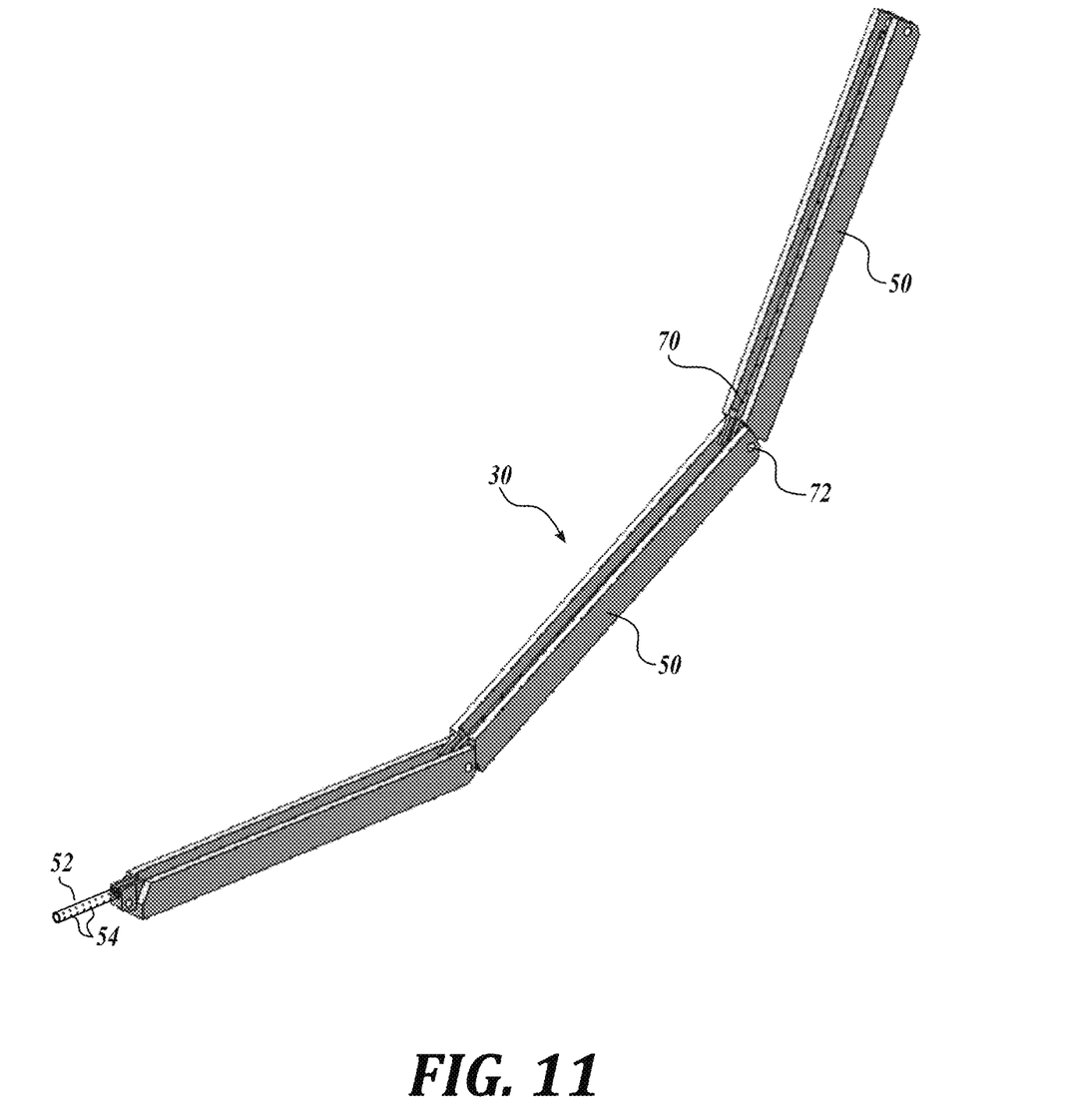
FIG. 11 is an enlarged isometric view of the portion of the manifold fracture.

Referring specifically to FIG. 11, a section of a manifold structure 30 is illustrated. The manifold structure 30 is composed of interconnected links 50 of a U or channel-shaped cross section. An air supply tube 52 is nested in the channels of the links 50. Outlet openings 54 are spaced along the length of the tube in the direction outwardly link channel. These outlet openings 54 serve as air release nozzles causing the pressurized air emitted from such nozzles to create air bubbles in the fluid flow of the pipeline 24.

The pressurized air is routed to the air supply tube 52 through extension arm 28 as well as through the spine 22 from a source of pressurized air exterior to the pipeline 24. The volume flow of the air is controllable so that a uniform sheet or curtain of air bubbles 60 is created to flow from manifold structures 30 diagonally upwardly to the catchment device 38.

Figure 8:
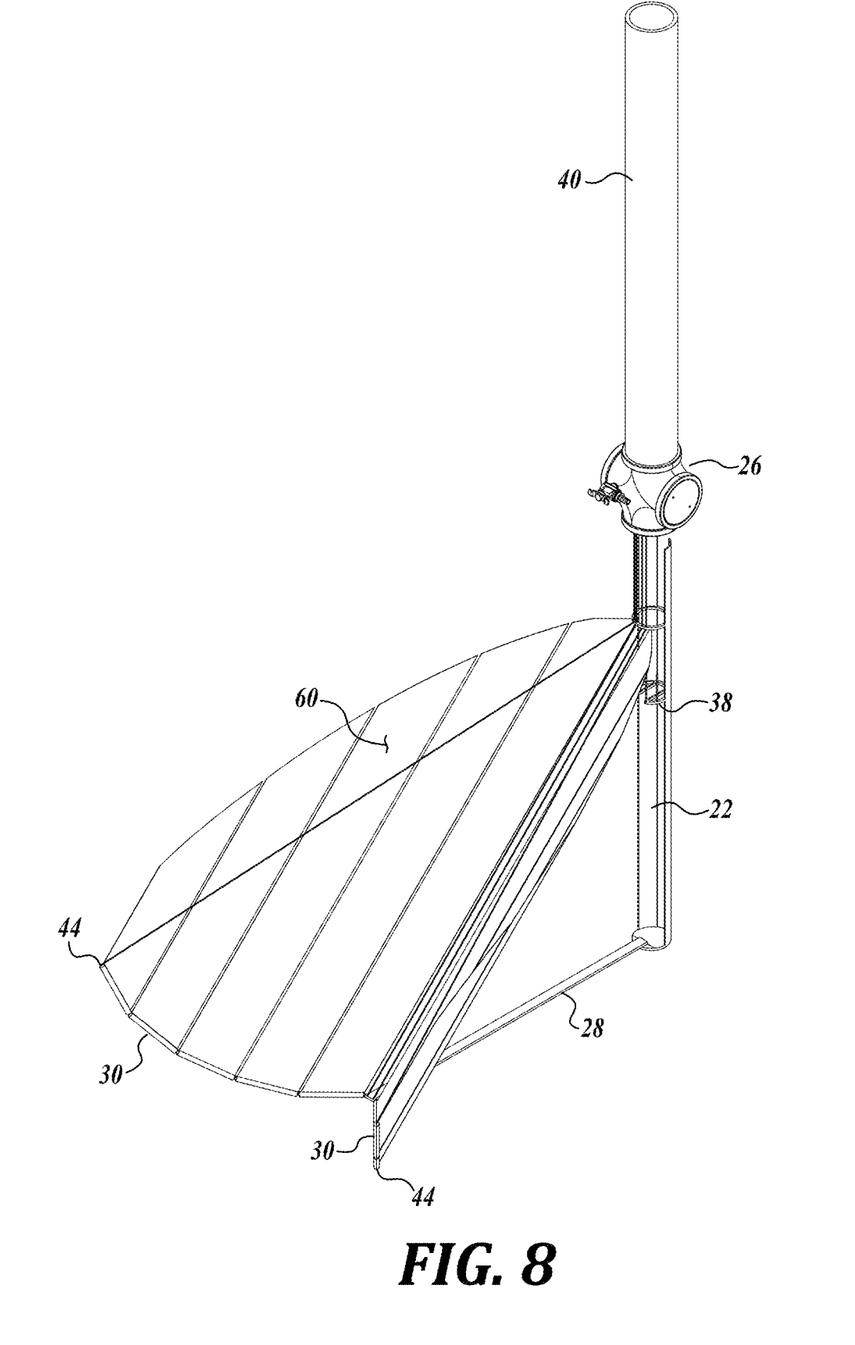
FIG. 8 is an isometric view of FIG. 7.
Figure 9:
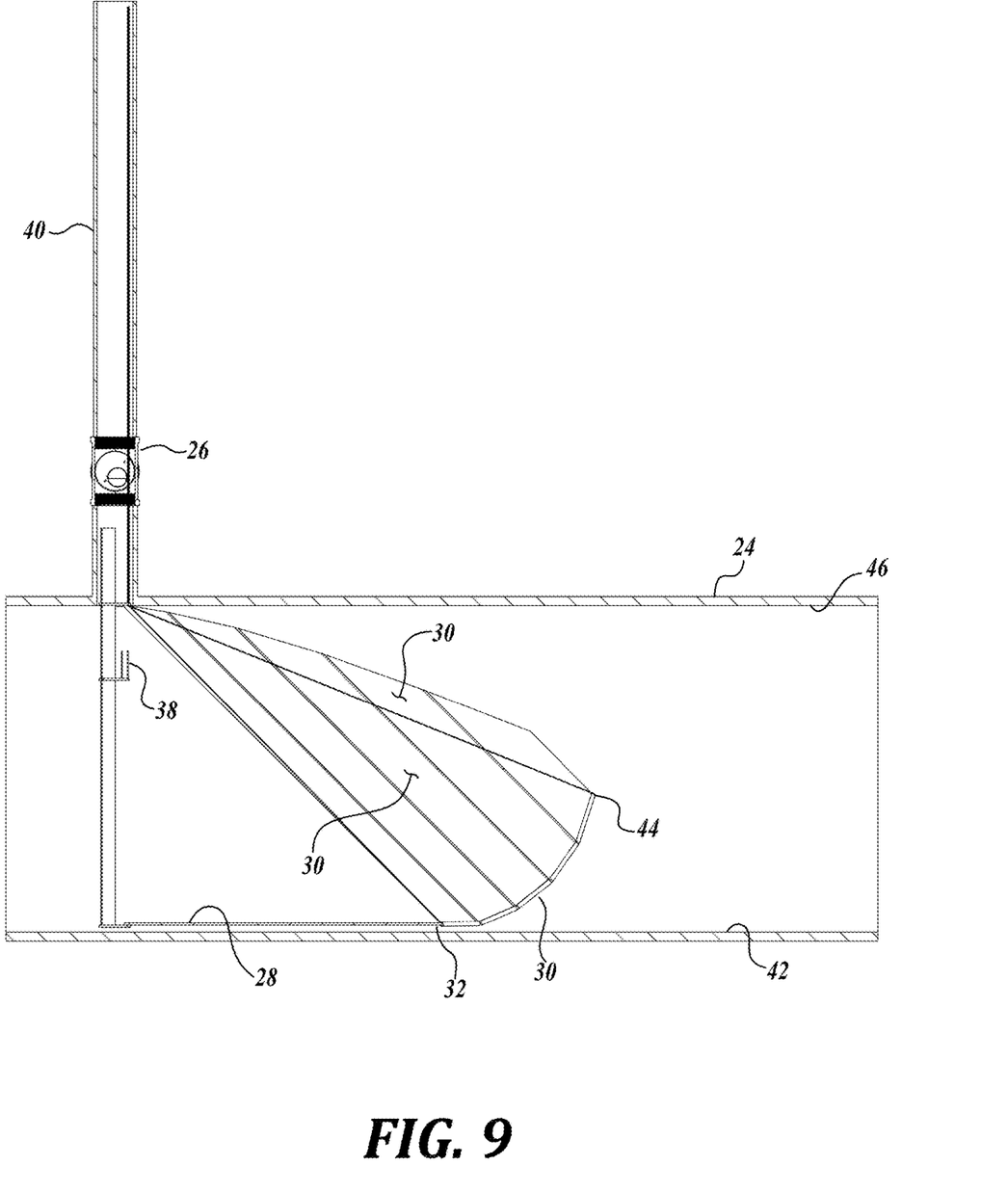
FIG. 9 is a side elevational view of FIG. 7.
Figure 10:
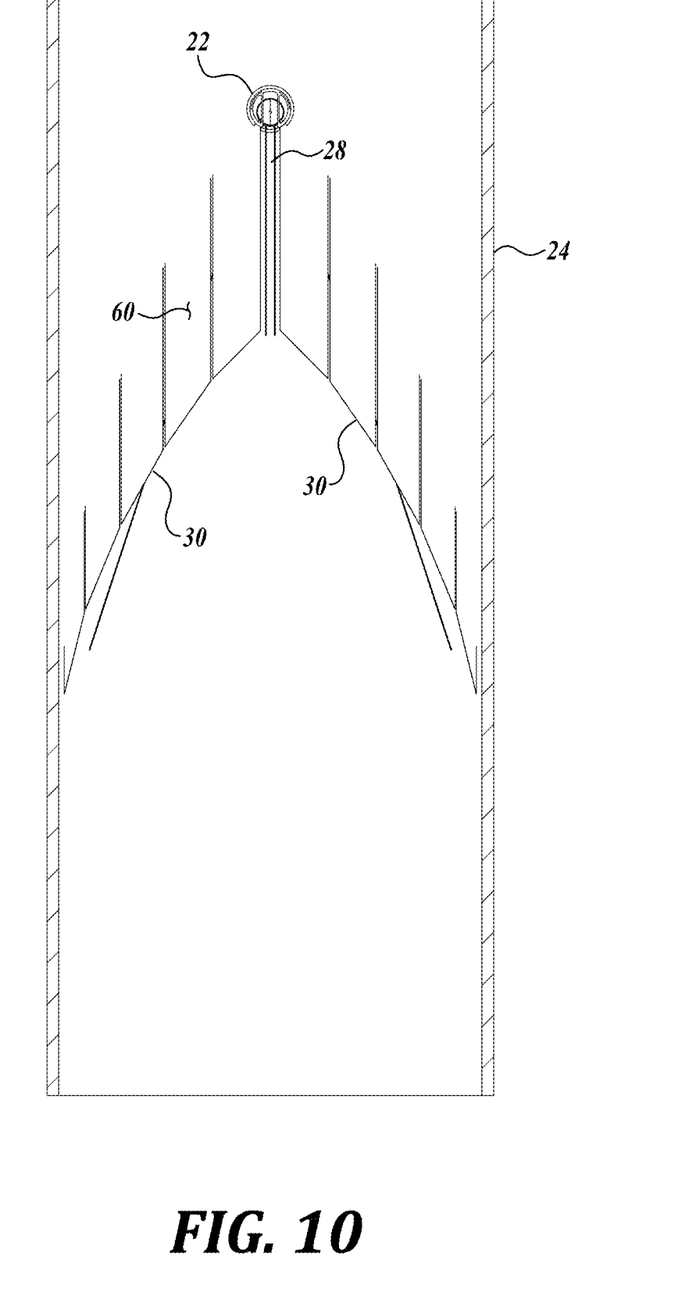
FIG. 10 is a top view of FIG. 7.

As shown in the foregoing figures the manifold structures 30 are permitted to flex to a limited degree in the downstream flow direction so that the manifold structures can lie against the inside wall of the lower portion of the pipeline 14 while maintaining a 45° angle relative to the longitudinal axis of the pipeline, see FIGS. 8 and 9. In this regard, stub projections 70 extend longitudinally from one end of each link 50 to engage within the channel of the adjacent link 50. A pin 72 extends through the sidewalls of the adjacent link 50 and through the stump projection 70 to interconnect the link. The ends of the link are not exactly parallel to each other, but are slightly slanted away from each other in the direction across the link from the web to the distal edges of the flanges. This allows the adjacent links to pivot slightly relative to each other in a manner shown in FIG. 11, but does not allow the links to pivot relative to each other in the opposite direction.

Figure 12:
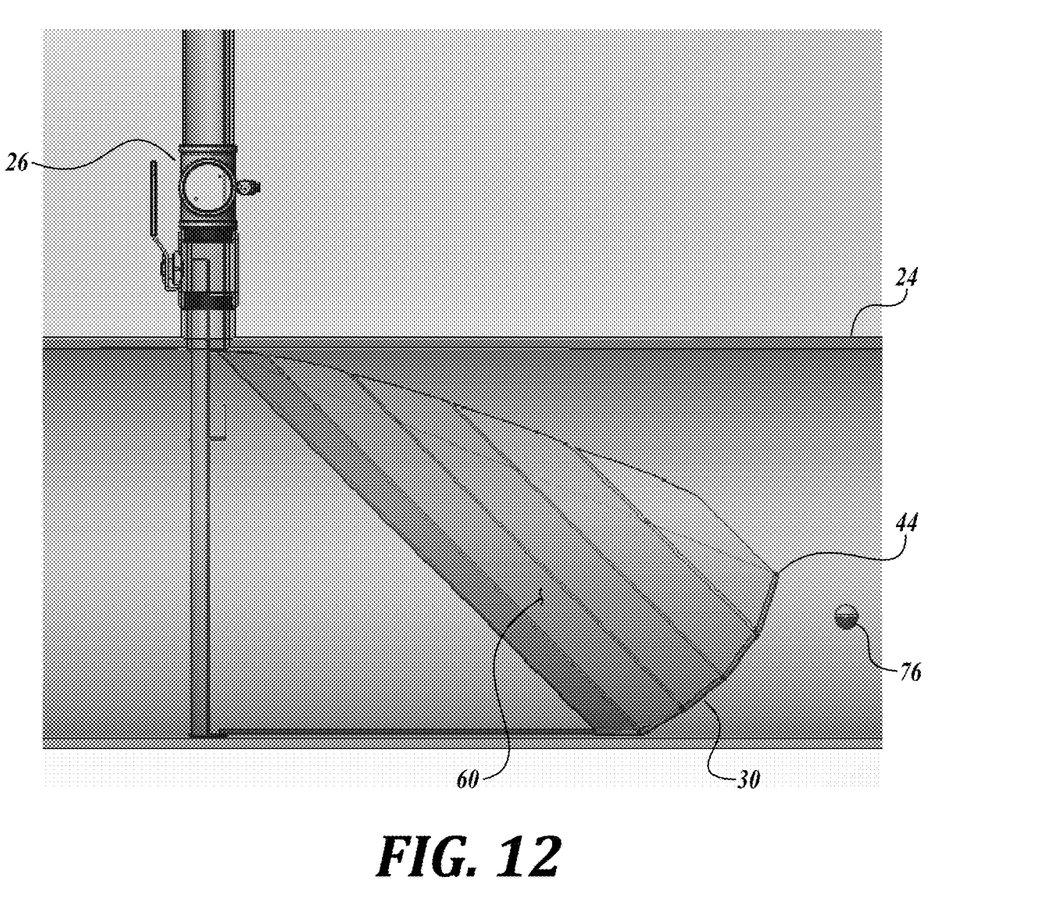
FIGS. 12-14 illustrate the retrieval assembly in use.
Figure 13:
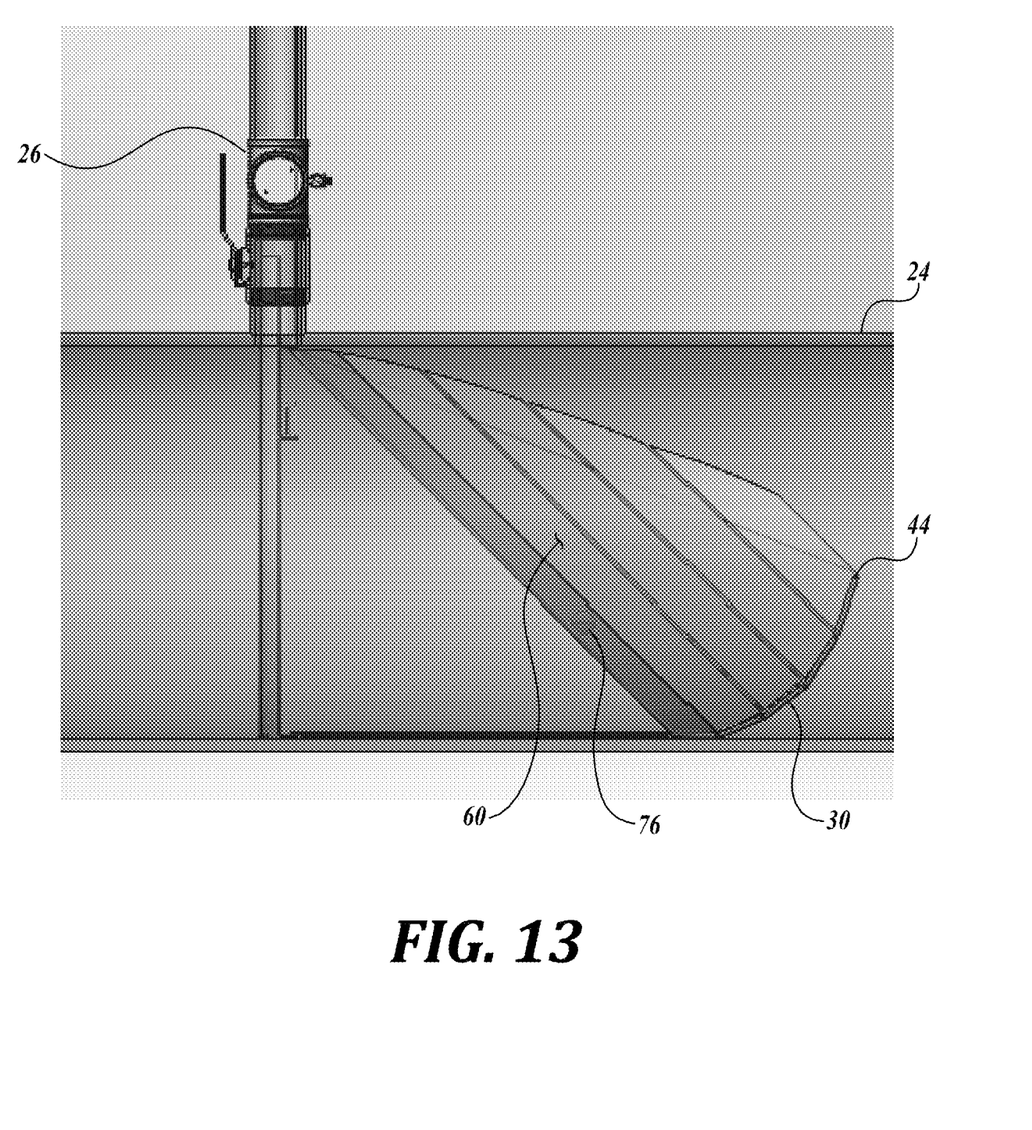
Figure 14:
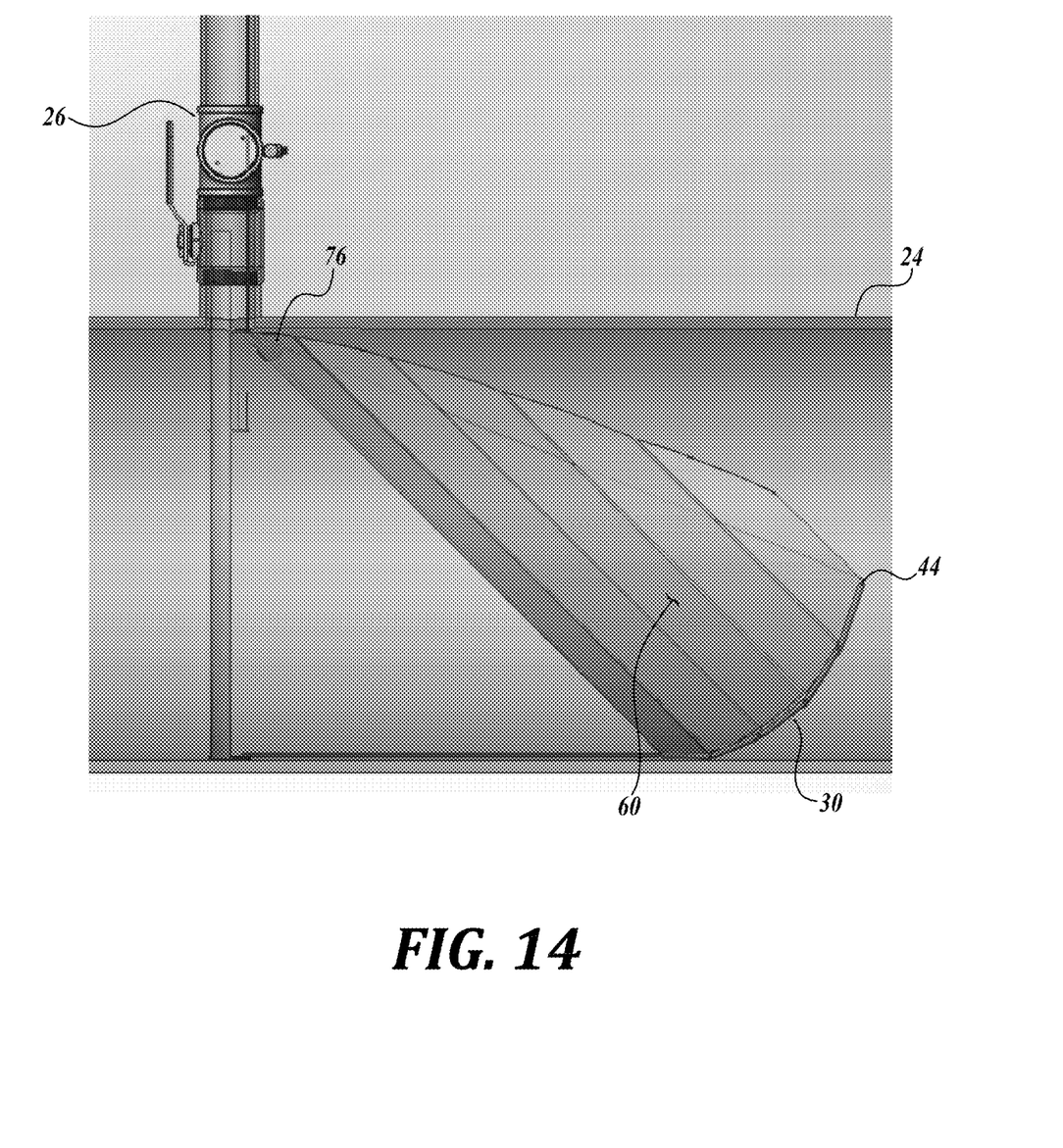

FIGS. 12, 13, and 14 illustrate the use of the assembly 20 in retrieving a leak detector 76. When the leak detector 76 encounters the sheet of air bubbles 60 the detector is redirected in the upward direction by the air bubbles to move toward the top of the spine 22 where the catchment device 38 is located. FIG. 12 shows the leak detector 76 being initially directed upwardly by the air bubble curtain. In FIG. 13, the leak detector has traveled further upwardly along the bubble sheet/curtain 60, and FIG. 14 shows the leak detector being captured by the catchment device 38. To this end, the flow of air through the manifold structures 30 is controlled so as to create a curtain/sheet of air bubbles 60 that rises about 1 to 2 feet per second. This elevation rate will cause the air bubble curtain or sheet 60 to form at about a 45° angle (plus or minus 10°-15°) to the flow through the pipeline 24. The manifold structures 30 are position at a distance of about from 1 to 2 diameters of the pipeline upstream from the spine structure 22. This results in the bubble sheet 60 directing the detector 76 to the catchment device 38.

Once the catchment device has been captured, the air to the manifold structures 30 can be terminated and then the manifold structures 30 and extension arm 28 retracted to folded position by manipulation of the control lines 34, 36a, and 36b. Thereafter, the retrieval assembly can be removed from pipeline 24 upwardly through the CARV, thereby completing the retrieval process.

While illustrative embodiments have been illustrated and described, it will be appreciated that various changes can be made therein without departing from the spirit and scope of the invention. For example, rather than utilizing air, pressurized water could be employed instead. Such pressurized water could be emitted from the manifold structures 30 to form a sheet of water flowing in the upper direction toward the catchment device 38 in a manner similar to the sheet of air bubbles 60 described above.

The embodiments of the invention in which an exclusive property or privilege is claimed are defined as follows:

1. A system to retrieve a buoyant leak detector traveling with fluid flowing in a pipeline, the system comprising:
   (a) a catchment device positionable above a bottom interior of the pipeline;
   (b) a flexible, elongate manifold structure having fluid outlet openings extending along the manifold structure;
   (c) a deployment system to deploy the manifold structure across a lower inside perimeter of the pipeline upstream from the catchment device; and
   (d) a source of pressurized air or water in communication with the manifold structure, whereby, when the pressurized air or water is supplied to the manifold structure, a curtain of air bubbles or water stream is emitted from the fluid outlet openings of the manifold structure in the direction downstream of the fluid flow in the pipeline and at angle upwardly from the location of the manifold structure to cause the leak detector to be deflected by the air bubbles or water stream toward the catchment device.

2. The system of claim 1, wherein the manifold structure comprises:
   a perimeter frame; and
   a tube extending along and attached to the perimeter frame.

3. The system of claim 2, wherein the perimeter frame comprises a plurality of links connected together in end-to-end relationship.

4. The system of claim 3, wherein the perimeter frame further comprising connectors that interconnect the adjacent end portions of the links to allow adjacent links to flex or rotate relative to each other through a limited angle in one direction only.

5. The system of claim 4, wherein the links of the perimeter frame are in the form of U-shaped channel members, and the tube is disposed between the flanges of the channel members.

6. The system of claim 1, wherein the deployment system comprises:
   a pivotable extension arm having a first end deployable to the bottom of the pipeline interior and a second end connected to the manifold structure;
   the first control line attached to a second end of the extension arm; and
   a first actuator located exterior to the pipeline to control the length of the first control line which in turn controls the orientation of the extension arm between a retracted generally vertical position and a deployed generally horizontal position.

7. The system of claim 6, wherein when in deployed position the extension arm is disposed on the bottom surface of the pipeline in the direction upstream relative to the flow of the pipeline.

8. The system of claim 6, wherein the second end of the extension arm is attached to the manifold structure at a location intermediate the ends of the manifold structure.

9. The system of claim 8, wherein the manifold structure comprises two sections, with the adjacent ends of the two sections attached to the second end of the extension arm.

10. The system of claim 6, further comprising:
    second and third control lines attached to two ends of the manifold structure;
    second and third actuators located exterior to the pipeline to control the lengths of the second and third control lines to position the manifold structure between a retracted position or, if the manifold structure is positioned longitudinally adjacent the extension arm and a deployed position or if the manifold structure lies along an inside surface of the pipeline, generally transversely to the length of the pipeline.

11. The system of claim 6, further comprising a spine deployable into the pipeline in an orientation substantially diametrical to the pipeline, the spine providing a mounting location for the first end of the extension arm.

12. The system of claim 11, wherein the spine providing a mounting location for the catchment device.

13. The system of claim 6, wherein the pressurized air or water is routed to the manifold structure through the extension arm.

14. The system of claim 1, further comprising a spine deployable into the pipeline in an orientation substantially diametrical to the pipeline, the spine providing a support for the deployment system.

15. The system of claim 14, wherein the spine providing a mounting location for the catchment device.

16. The system of claim 15, wherein the pressurized air or water is routed to the manifold structure through components of the deployment system.

17. The system of claim 1 wherein the catchment device comprises a net structure.

18. The system of claim 17, wherein the net structure is positioned adjacent the top of the interior of the pipeline.

19. A method of retrieving a buoyant leak detector traveling with fluid flowing in a pipeline, the method comprising:
    positioning a catchment device in an upper region of the pipeline; and
    emitting a curtain of air bubbles or water stream from a lower region of the pipeline and from a location upstream from the catchment device in a volume rate that causes the air bubbles or water stream to flow upwardly toward the catchment device as the air bubbles or water stream flows downstream with the fluid flowing in the pipeline to direct the leak detector toward the catchment device.

20. The method of claim 19, further comprising:
    deploying a manifold across a lower region of the pipeline and at a location up stream of the catchment device, the manifold having a plurality of outlet nozzles along the length of the manifold; and
    supplying air or water to the manifold for emission through the outlet nozzles and into the flow stream of the pipeline.

21. The method of claim 20, wherein the manifold is deployed from a location exterior of the pipeline.

* * * * *